(12) United States Patent
Kim

(10) Patent No.: US 11,735,071 B1
(45) Date of Patent: Aug. 22, 2023

(54) DIGITAL BILLBOARD FOR VEHICLE

(71) Applicant: Byeongyeon Kim, Incheon (KR)

(72) Inventor: Byeongyeon Kim, Incheon (KR)

( * ) Notice: Subject to any disclaimer, the term of this patent is extended or adjusted under 35 U.S.C. 154(b) by 0 days.

(21) Appl. No.: 17/702,061

(22) Filed: Mar. 23, 2022

(51) Int. Cl.
*G09F 7/18* (2006.01)
*G09F 21/04* (2006.01)
*B60R 13/00* (2006.01)
*G09F 9/33* (2006.01)

(52) U.S. Cl.
CPC .............. *G09F 7/18* (2013.01); *B60R 13/00* (2013.01); *G09F 9/33* (2013.01); *G09F 21/048* (2013.01); *G09F 2007/1843* (2013.01); *G09F 2007/1865* (2013.01); *G09F 2007/1873* (2013.01)

(58) Field of Classification Search
CPC ..... G09F 2007/1873; G09F 2007/1865; G09F 2007/1843; G09F 21/048; G09F 9/33; G09F 7/18; B60R 13/00
See application file for complete search history.

(56) References Cited

U.S. PATENT DOCUMENTS

| | | | |
|---|---|---|---|
| 6,393,748 B1 * | 5/2002 | Cooper | G09F 15/0056 248/165 |
| 2017/0211786 A1 * | 7/2017 | Pan | F16B 21/02 |
| 2019/0159349 A1 * | 5/2019 | Yi | G09F 9/33 |
| 2019/0162215 A1 * | 5/2019 | Santillan Gutierrez | F16B 2/22 |
| 2020/0380896 A1 * | 12/2020 | Alex | G09F 21/042 |
| 2020/0408238 A1 * | 12/2020 | McKeiman, Jr. | F16B 39/225 |
| 2022/0169272 A1 * | 6/2022 | Jablovski | B60W 50/14 |
| 2022/0213911 A1 * | 7/2022 | Pasternak | G09F 1/10 |
| 2022/0333625 A1 * | 10/2022 | Wan | F16B 2/02 |

FOREIGN PATENT DOCUMENTS

KR 2020120005140 U 7/2012

* cited by examiner

*Primary Examiner* — David R Dunn
*Assistant Examiner* — Christopher E Veraa
(74) *Attorney, Agent, or Firm* — NKL Law; Byungwoong Park

(57) ABSTRACT

Provided is a digital billboard for vehicle. The technical gist of the present disclosure is that it can be installed in various vehicles such as buses and trucks, and can deliver advertisement contents to more citizens while driving, so that advertisers can quickly deliver advertisement contents or achieve advertising purpose, thereby maximizing the effect expected by advertisers. As a vehicle provided with a digital billboard travels, advertising contents can be imprinted in the minds of people due to dynamic visibility. In doing so, it is possible to easily achieve purposes intended by advertisers. In the event of a malfunction of the billboard, it is possible to easily replace the digital billboard firmly fixed in a sliding manner in an advertisement frame.

2 Claims, 10 Drawing Sheets

[Fig.1]
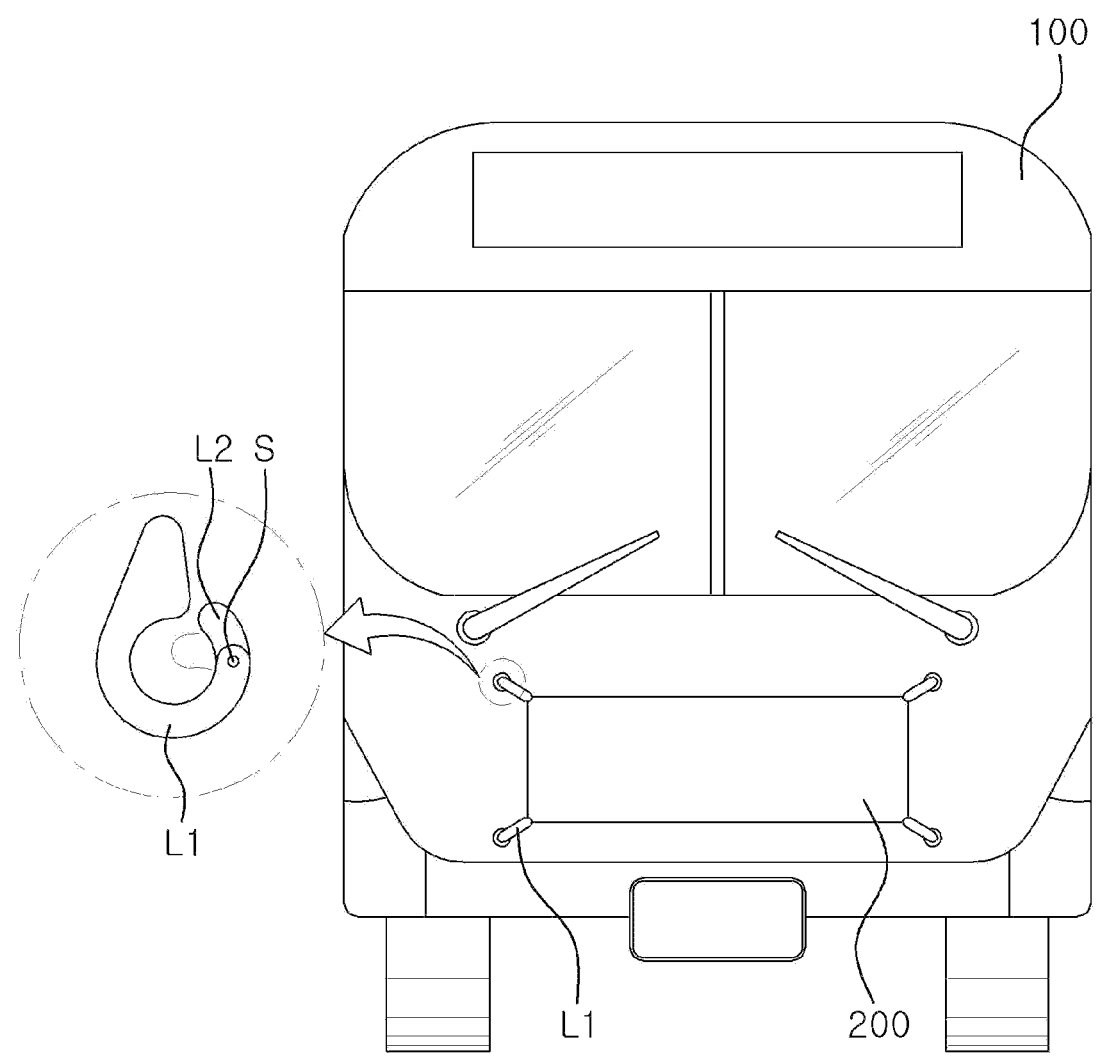

[Fig.2]
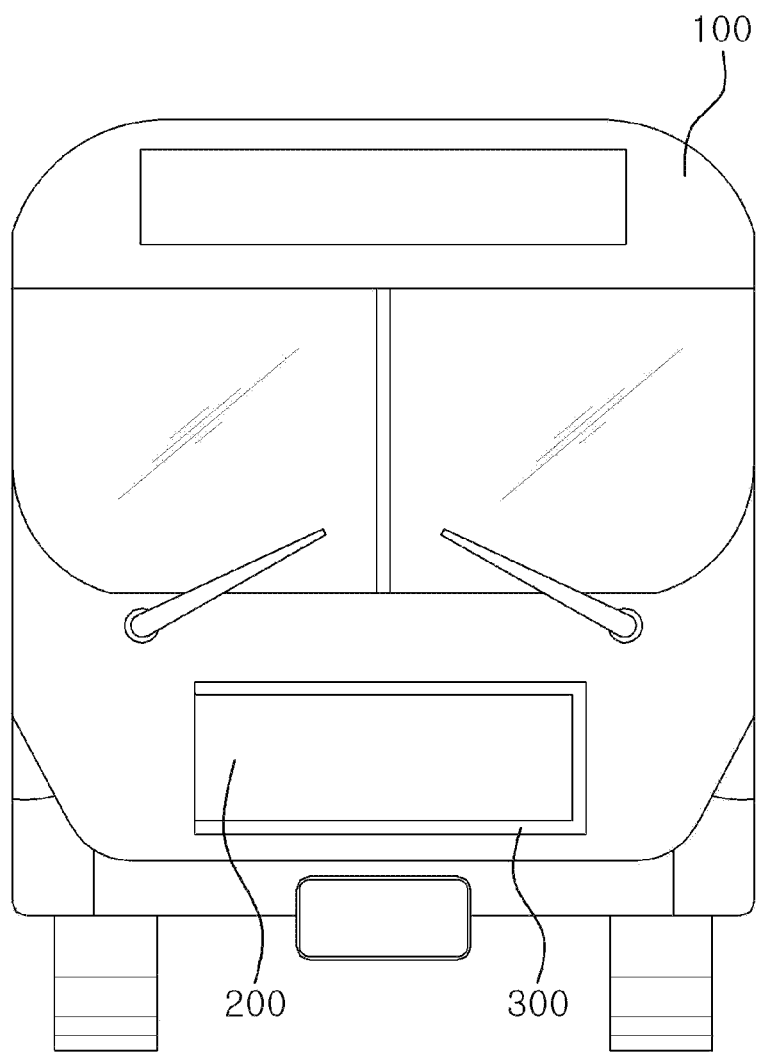

[Fig.3]
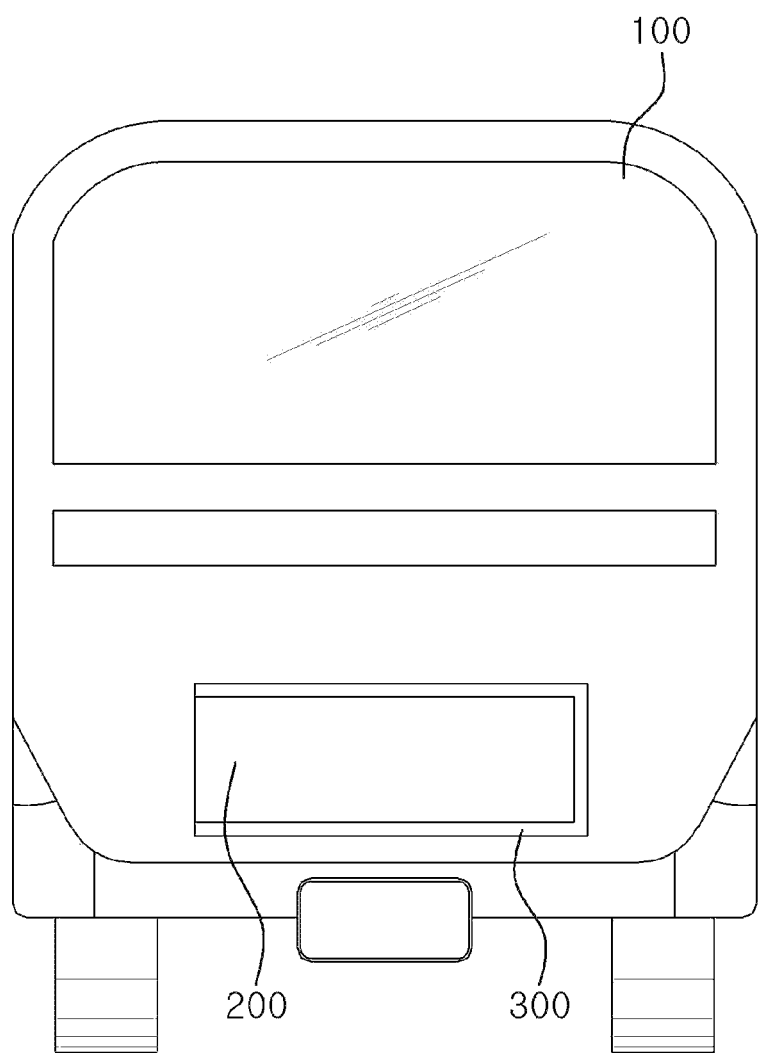

[Fig.4]
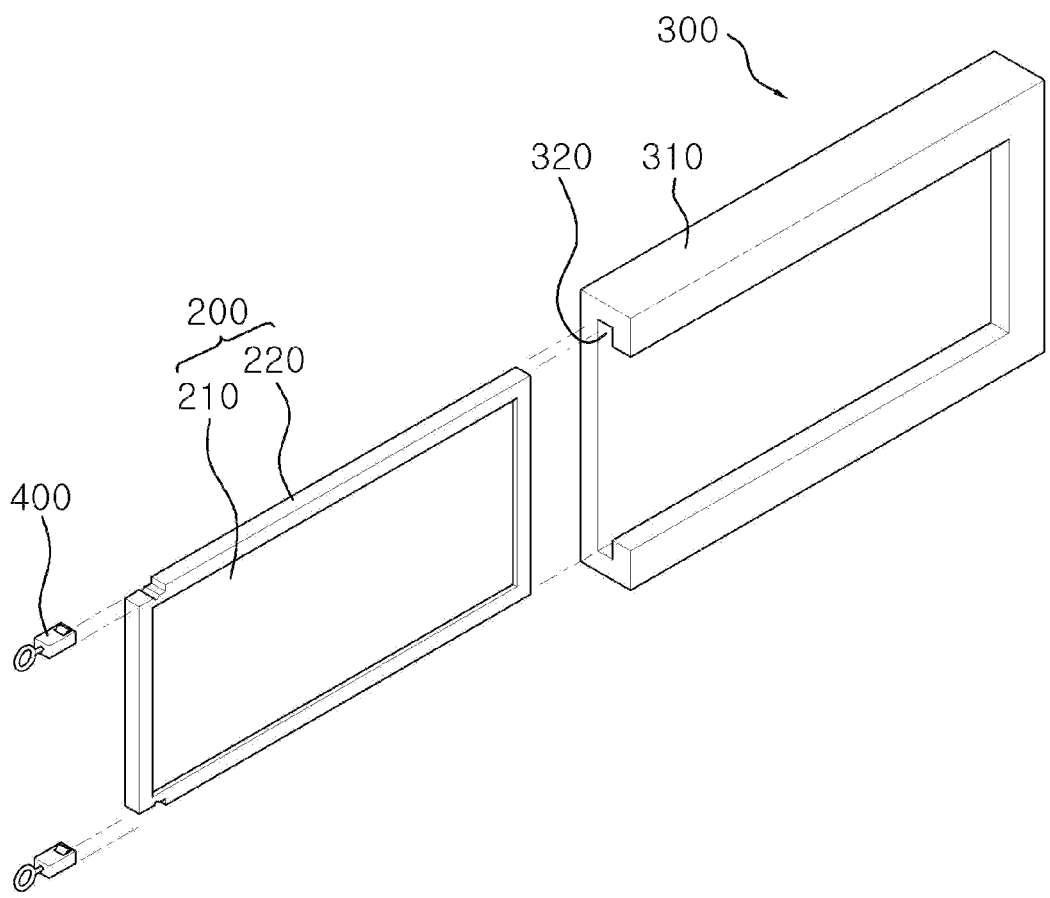

[Fig.5]
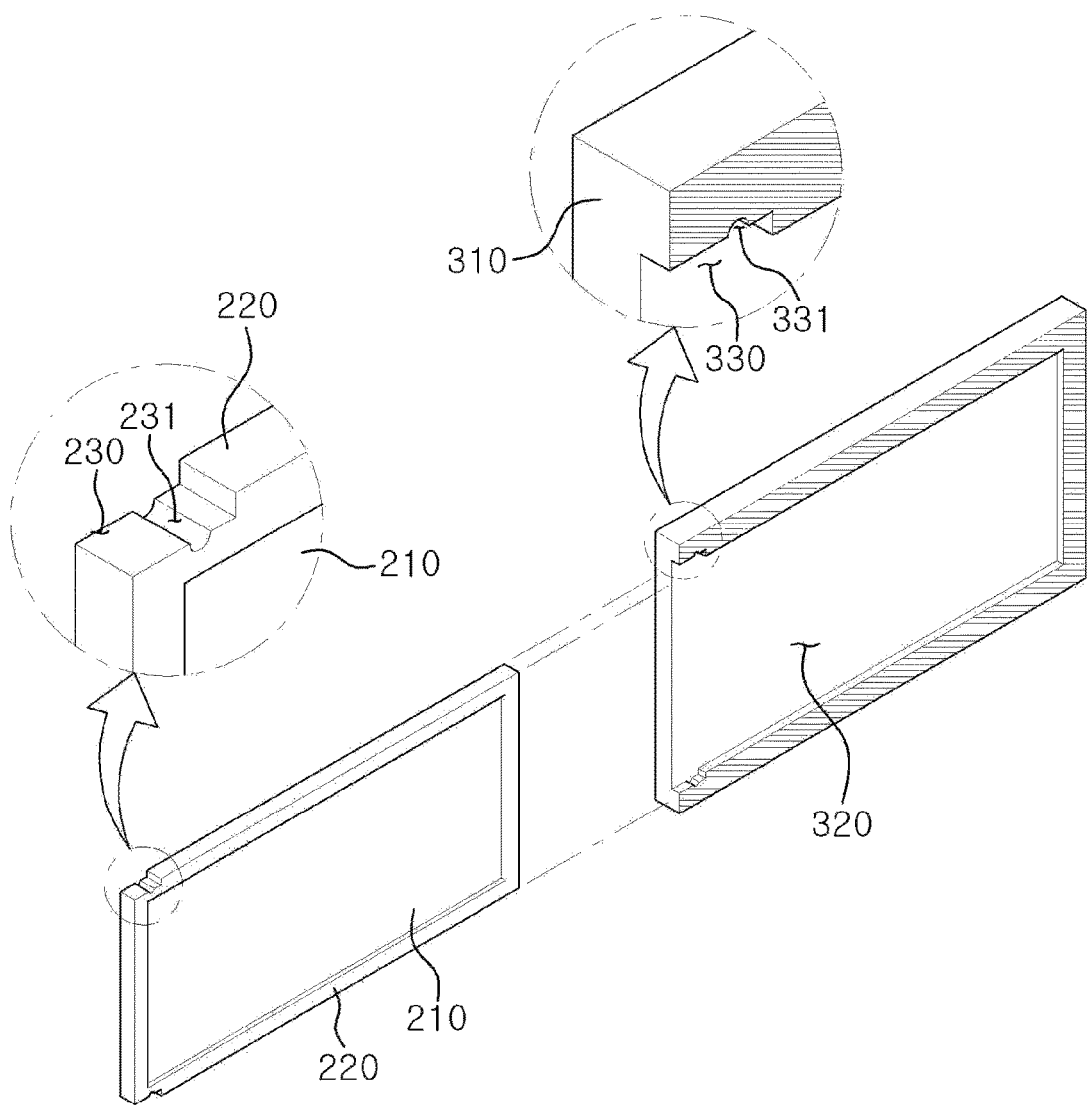

[Fig.6]
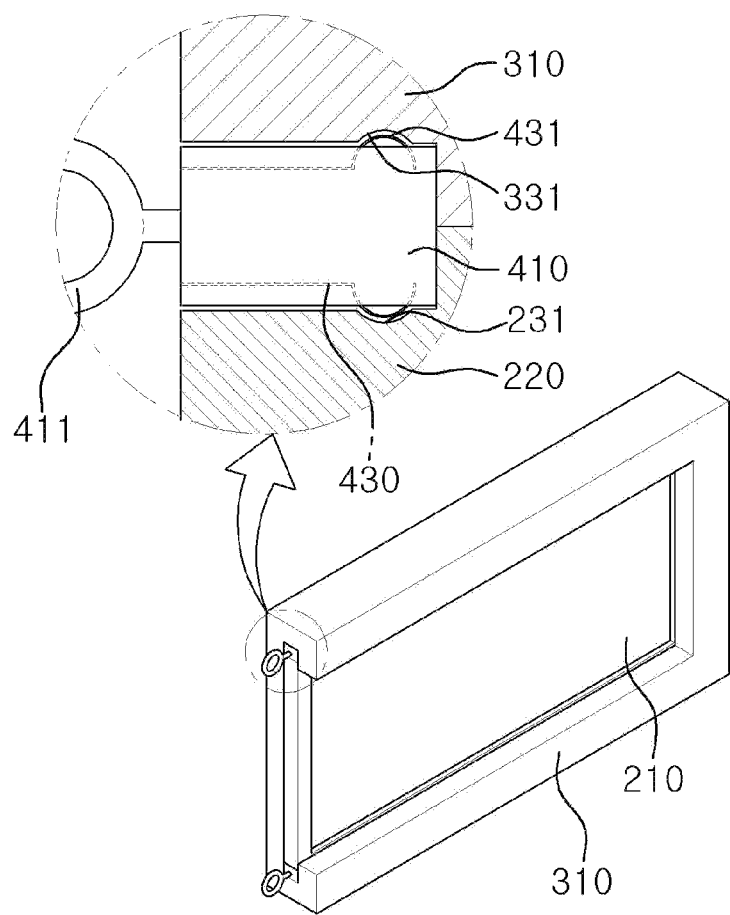

[Fig.7]
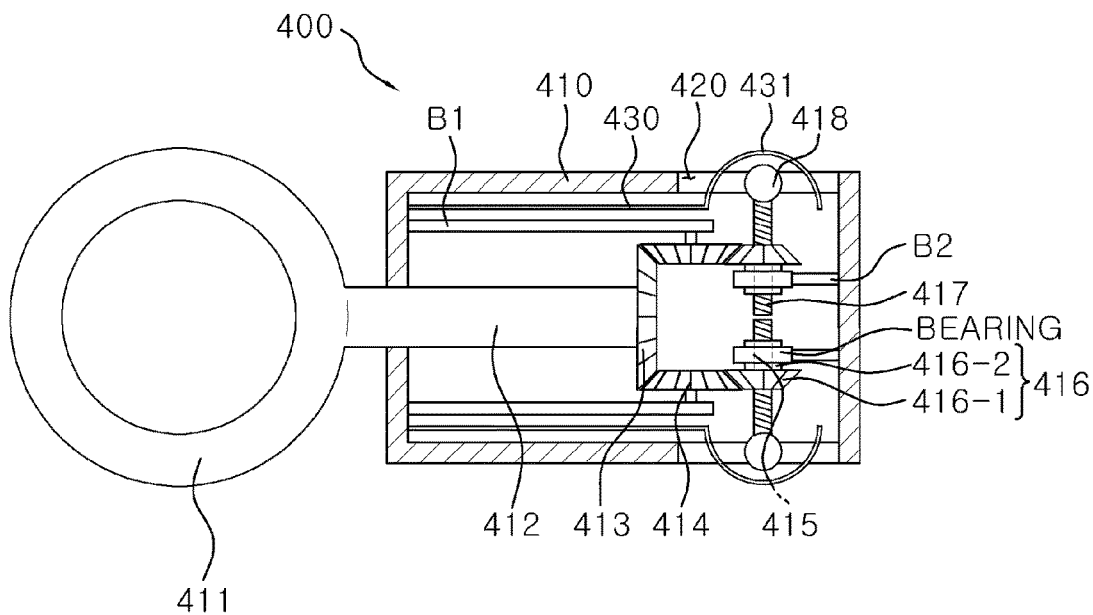
[Fig.8]
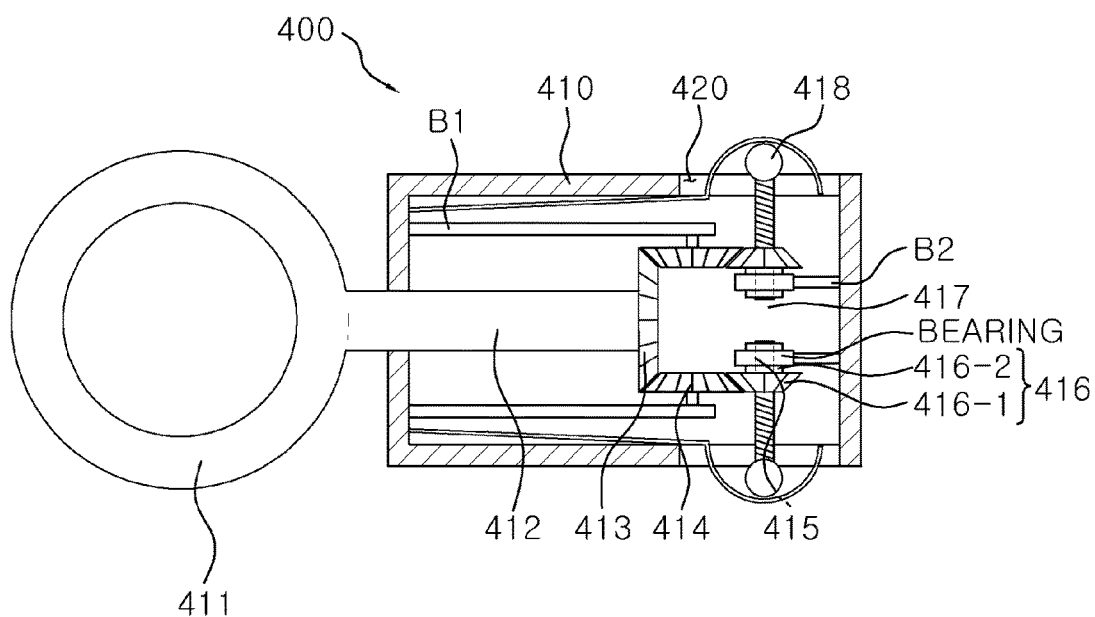

[Fig.9]
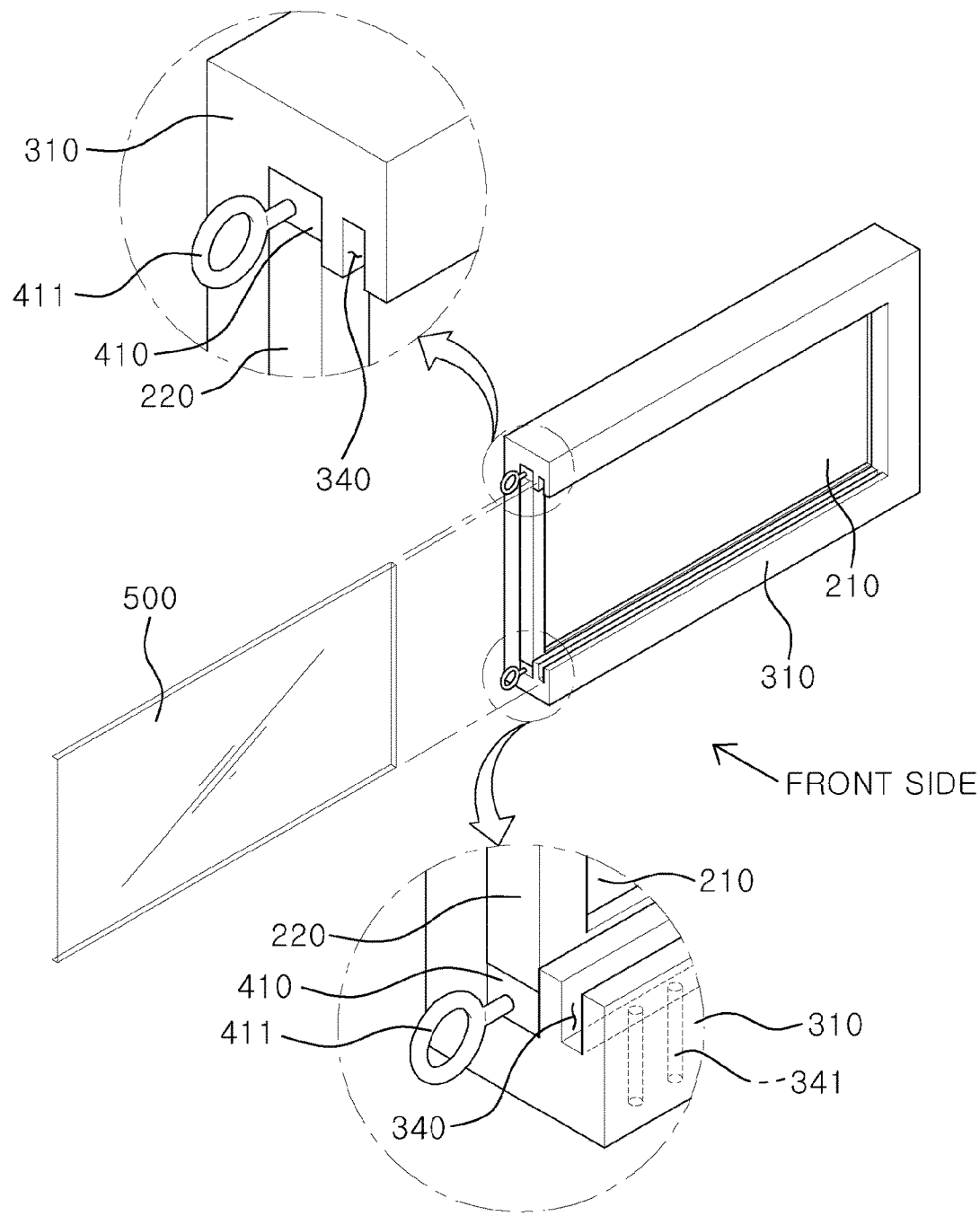

[Fig. 10]
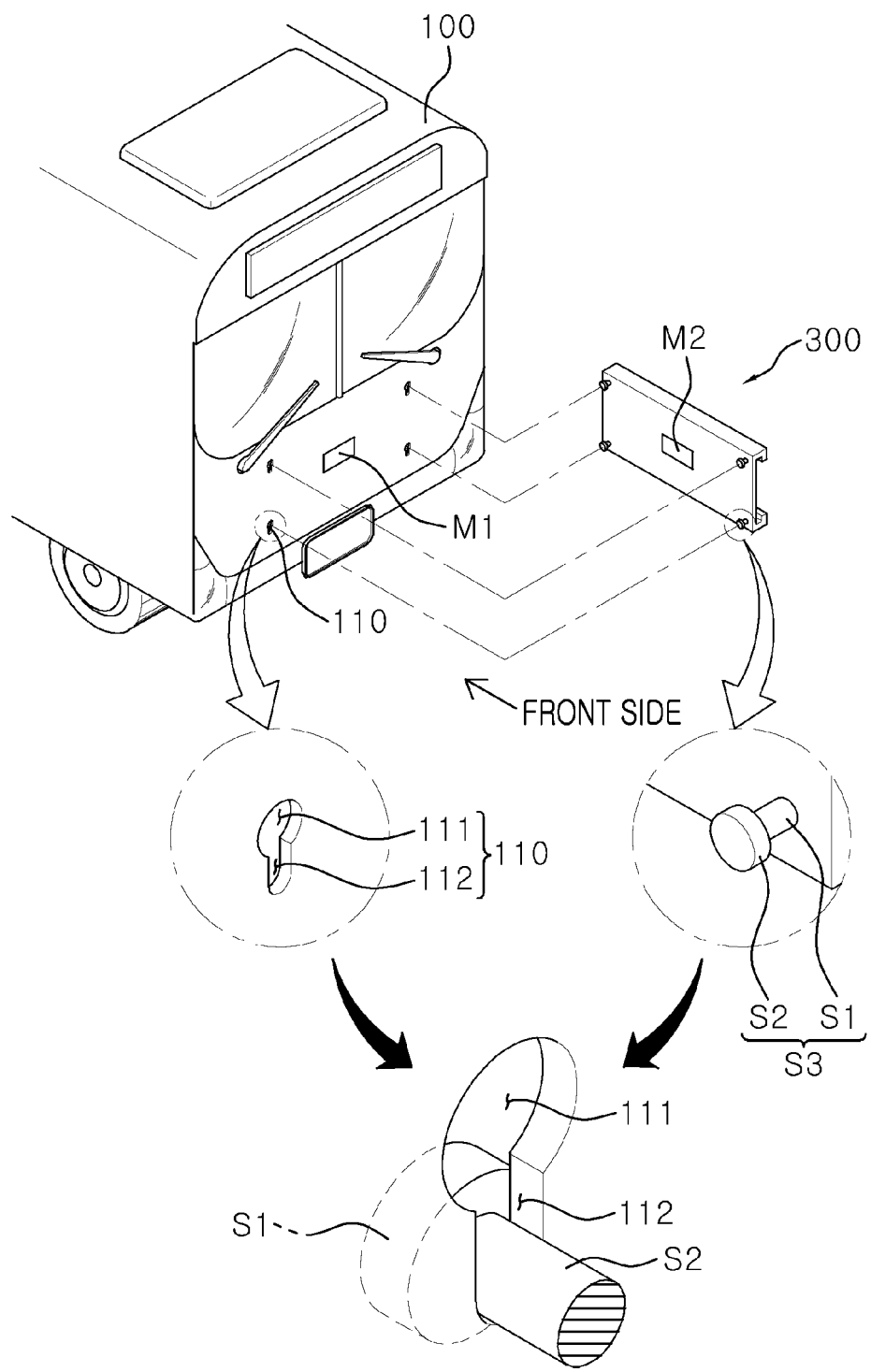

[Fig.11]
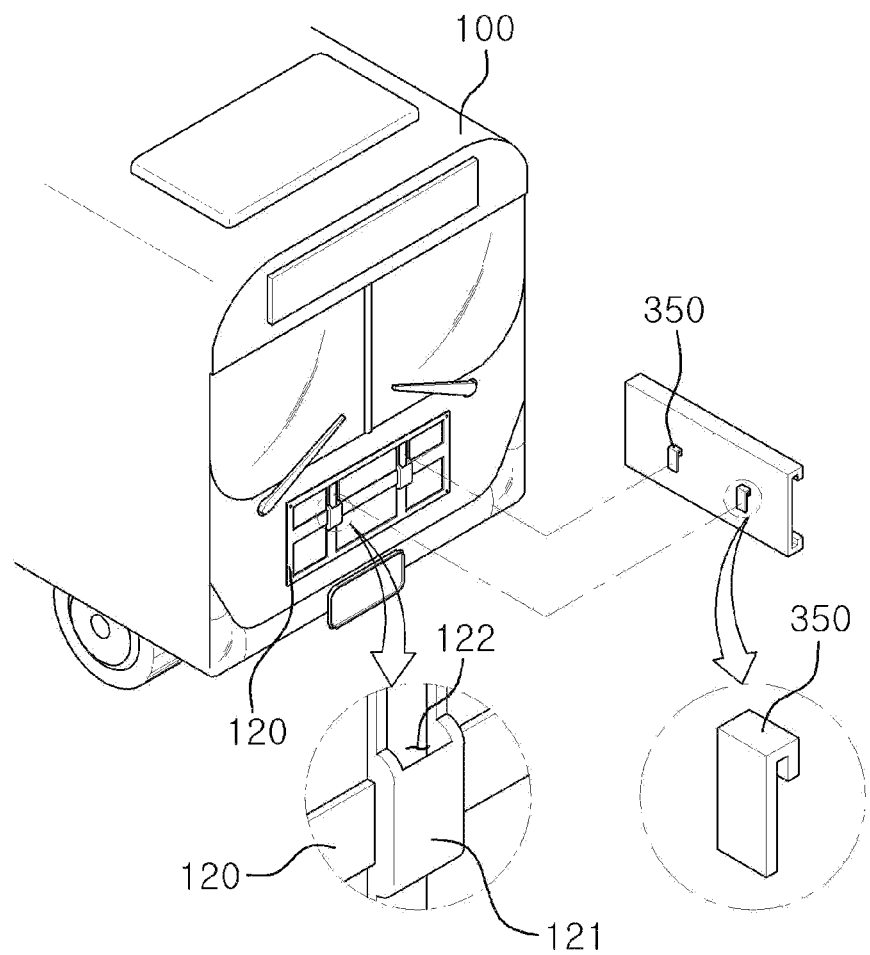

DIGITAL BILLBOARD FOR VEHICLE

BACKGROUND

Field of the Disclosure

The present disclosure relates to a digital billboard for vehicle. More particularly, the present disclosure relates to a digital billboard for vehicle provided with a billboard, so that a running vehicle provided with public or general billboard can advertise many people.

Related Art

Advertisement is an information activity that companies, individuals and organizations invest in to inform the world about products, services, ideology, creeds, and policies to achieve intended purposes.

As a general advertising method, advertisement is fixedly provided through a TV medium, a billboard, a cloth, a wall, a roof, or a floor of a building.

In more detail, flyers, billboards, and mass media can be used to deliver information about restaurants, stationery stores, markets, bars/restaurants, and private academic institutes. In particular, if a billboard is attached to a vehicle, it is expected to increase the advertising effect when the vehicle travels.

As a related art, Korean Utility Patent Publication No. 20-2012-0005140 (published on Jul. 13, 2012) relates to a monitor-installed monitor billboard installed indoors and outdoors, and is titled a panel-type monitor billboard, which provides stability to a panel-type monitor from external shocks and the like and prevents an inflow of liquids such as rainwater and provide convenience of installation when the monitor billboard is installed outdoors.

However, the billboard of the related art can be installed only indoors so cannot deliver advertising content to many people.

SUMMARY

An object of the present disclosure is to provide a digital billboard for vehicle, the billboard capable of being installed in any of various vehicles such as buses and trucks to advertise to more people during operation.

An object of the present disclosure is to provide advertising content to many people due to dynamic visibility as a vehicle provided with a billboard travels around.

An object of the present disclosure is to replace a digital billboard, which is fixed in a sliding manner, when the billboard malfunctions.

A digital billboard for vehicle of the present disclosure includes a vehicle and an LED billboard 2 provided at front and back sides of the vehicle.

Each of the front and back sides of the vehicle may be perforated at one point, and a connection link may be coupled thereto to fix the LED billboard, and the connection link may be provided with a separation preventing part that is fixed by a torsion spring at a free end.

The vehicle may be provided with a slide-type advertisement frame installed at front and back sides. The slide-type advertisement frame may be provided with a frame, an inner groove may be provided on one side of the frame, and a first fixing groove may be provided at each of upper and lower entrances of the inner groove, and a first auxiliary groove may be provided in a direction outward of the first fixing groove with respect to the center of the frame. The LED billboard may include a display part and a bezel part, and a second fixing groove and a second auxiliary groove may be provided in the bezel part to have directions and shapes opposite to directions and shapes of the first fixing groove and the first auxiliary groove of the frame when the LED billboard is inserted into the inner groove of the slide-type advertisement frame. The fixing part may be provided with a fixing body having a space inside, an opening may be provided at upper and lower surfaces of the fixing body, and a pair of plate springs each having one end fixed to the inside of the fixing body may be vertically provided inside the fixing body. When the fixing part is inserted into the fixing groove, fixtures of the plate springs may be inserted into the first auxiliary groove and the second auxiliary groove, respectively, so as to prevent the LED billboard from being separated from the slide-type advertisement frame.

The digital billboard for vehicle according to the present disclosure may be installed in any of various vehicles such as buses and trucks and may deliver advertisements to more people while a corresponding vehicle travels, so that advertisers can quickly deliver advertising contents or achieve advertising purpose, thereby achieving the effects expected by advertisers.

As a vehicle provided with a digital billboard travels, advertising contents can be imprinted in the minds of people due to dynamic visibility. In doing so, it is possible to easily achieve purposes intended by advertisers.

In the event of a malfunction of the billboard, it is possible to easily replace the digital billboard firmly fixed in a sliding manner in the advertisement frame.

BRIEF DESCRIPTION OF THE DRAWINGS

FIG. 1 is an exemplary view showing that an LED billboard is fixed by a connection link to the front side of a bus provided with a digital billboard for vehicle according to the present disclosure;

FIGS. 2 and 3 are exemplary views showing an LED billboard coupled to a slide-type advertisement frame at front and back sides of a digital billboard for vehicle according to the present disclosure;

FIGS. 4 to 6 are exemplary views showing a coupling relationship between a slide-type advertisement frame and an LED billboard of a digital billboard for vehicle according to the present disclosure;

FIGS. 7 and 8 are exemplary views showing the inside of a fixing part of a digital billboard for vehicle according to the present disclosure;

FIG. 9 is an exemplary view showing that a rainwater shield plate is coupled to a slide-type advertisement frame according to the present disclosure; and FIGS. 10 and 11 are exemplary views illustrating a method for fixing a slide-type advertisement frame to a vehicle according to the present disclosure.

DETAILED DESCRIPTION

Hereinafter, a digital billboard for vehicle according to an embodiment of the present disclosure will be described with reference to the accompanying drawings.

As shown in FIGS. 1 to 3, an LED billboard 200 is installed at the front and back sides of any of various vehicles 100, such as a bus or a truck.

The LED billboard 200 is of an LED type, and the LED (light emitting diode) is a semiconductor made of a light emitting diode, gallium (Ga), phosphorus (P), and arsenic (As) as materials.

In particular, the LED has characteristics of a diode, and when a current flows, the LED emits light in red, green, and yellow. The LED has a longer lifespan compared to a light bulb, has a fast response speed (which indicates a time required for a current to flow so that light is emitted), and can be made in any of various shapes.

As shown in FIG. 1, each of the front and back sides of the vehicle are perforated at one point, and a connection link L1 is coupled thereto to fix the LED billboard 200. The connection link L1 is provided with a separation preventing part L2 that is fixed by a torsion spring S at a free end (a hook end).

More specifically, the separation preventing part L2 provided at the free end of the connection link L1 is basically in a state in which an opening part of the connection link L1 is always closed by the torsion spring S, and the separation preventing part L2 may move inward of the connection link L1 so as to hook an object easily.

That is, the object to be caught in the connection link L1 pushes the separation preventing part L2 in a direction inward of the connection link, and when the object is caught in the connection link L1, the separation preventing part L2 returns to its original position by elasticity of the torsion spring S so that the connection link L2 is closed again.

As shown in FIGS. 2 and 3, the vehicle 100 is provided with a slide-type advertisement frame 300 installed at front and back sides.

The slide-type advertisement frame 300 is fixed to the vehicle 100 by a bolt or a strong adhesive.

The slide-type advertisement frame 300 is provided with a frame 310, and an inner groove 320 is provided on one side of the frame 310.

More specifically, the front side of the slide-type advertisement frame 300 is opened so that the front side of the LED billboard 200 inserted into the inner groove 320 of the slide-type advertisement frame 300 can be viewed from the outside, and the inner groove 320 is provided in a manner in which upper and lower portions of the slide-type frame 310 are bent toward the center of the frame 310 by a predetermined height so that the LED billboard 200 does not deviate from the slide-type advertisement frame 300 to the front.

The fact that the frame 310 is bent toward the center by the predetermined height means that a bezel part 220 of the LED advertisement board 200 is bent enough to be covered, so that a display part 210 of the LED advertisement billboard 200 is fully exposed and thus people can view the entire area of the display part 210.

A first fixing groove 330 is provided at the entrance of the inner groove 320 provided at each of upper and lower portions of the frame 310, and a first auxiliary groove 331 is provided in an outward direction of the first fixing groove 330 with respect to the center of the frame 310.

The first fixing groove 330 is provided at each of the upper and lower portions based on the frame 310, and the first fixing groove 330 at the upper portion has a shape in which the entrance of the inner groove 320 is cut, so that the first fixing groove 330 has a shape like a step, as viewed in a cross-sectional view.

The first fixing groove 330 provided at the lower portion of the frame 310 is also cut at the entrance of the inner groove 320 in a direction inward of the inner groove 320, so that the first fixing groove 330 has a shape like a step as viewed in the cross-sectional view.

The expression "entrance" refers to the gateway to an alley, such as a door, and the expression "gateway" refers to the front of a way. Therefore, the entrance of the inner groove 320 refers to an entry opening of the inner groove.

A first auxiliary groove 331 provided at the upper portion of the first fixing groove 330 is processed into an arc shape toward an upper side of the frame 310, and, conversely, a first auxiliary groove 331 provided at the lower portion of the first fixing groove 330 is processed into an arc shape toward a lower side of the frame 310.

The LED billboard 200 includes the display part 210 and the bezel part 220.

The display part 210 is a side through which contents that an advertiser wants to advertise through LEDs is viewed to the outside. A bezel of the bezel part 220 is provided along an outer circumference of the display to protect the display, and the bezel is usually made of synthetic resin.

The LED billboard 200 is connected to the inside of the vehicle 100 by electric wires and operated by a computer.

A second fixing groove 230 and a second auxiliary groove 231 are provided at the bezel part 220. The second fixing groove 230 and the second auxiliary groove 231 are provided in the bezel part 220 to have directions and shape opposite to those of the first fixing groove 330 and the first auxiliary groove 331 of the frame 310 when the LED billboard 200 is inserted into the inner groove 320 of the slide-type advertisement frame 300.

In other words, the second fixing groove 230 is provided in the bezel 220 in a manner in which upper and lower portions of the bezel part 220 are cut to have shapes corresponding to the first fixing groove 330 and the first auxiliary groove 331, and the second auxiliary groove 231 in an arch shape is formed at one point of the second fixing groove 230 toward the center of the LED billboard 200.

As shown in FIGS. 4 to 6, a fixing part 400 is formed, which is inserted into a fixing groove H where the first fixing groove 330 and the second fixing groove 230 communicate with each other.

The fixing groove H refers to a hole through which the first fixing groove 330 and the second fixing groove 230 communicate with each other when the LED billboard 200 is inserted into the slide-type advertisement frame 300.

The fixing part 400 is provided with a fixing body 410 having a space inside, an opening 420 is provided at upper and lower surfaces of the fixing body 410, and a pair of plate springs 430 each having one end fixed to the inside of the fixing body 410 are vertically provided inside the fixing body 410.

An arc-shaped fixing object 431 provided at a free end of the plate spring 430 is exposed through each opening 420.

The pair of plate springs 430 provided inside the fixing body 410 is provided in a manner in which one of the plate springs 430 is spaced apart from the other by a predetermined distance based on the center of the fixing body 410.

When the fixing part 400 is inserted into the fixing groove H, fixtures 431 of the plate springs 430 are inserted into the first auxiliary groove 331 and the second auxiliary groove 231, respectively, so as to prevent the LED billboard 200 from being separated from the slide-type advertisement frame 300.

As shown in FIGS. 7 and 8, a ring-shaped link 411 is provided at an outside of the fixing body 410 of the fixing part 400, and an insertion rod 412 to be inserted into the fixing body 410 is provided at one point of the ring-shaped link 411. A first bevel gear 413 is provided at ab end of the insertion rod 412. A second bevel gear 414 is provided at both sides of the first bevel gear 413 in a direction perpendicular to the first bevel gear 413. A pair of driving pinions 416 each having a central hole 415 therein is provided on the other side of the first bevel gear 413 with respect to the second bevel gear 414. The central hole 415 of each of the driven pinions 416 is provided with a female thread on an inner circumferential surface thereof. A full thread bolt 417 passing through the central hole 415 is provided, and a push ball 418 is formed in the full thread bolt 417 in a direction toward the fixing body 431.

This is, when a user rotates the ring-shaped link 411 in one direction, the first bevel gear 413 installed at the end of the insertion rod 412 is rotated. In this case, the pair of second bevel gears 414 provided vertically at the both sides of the first bevel gear 413 is rotated in opposite directions and accordingly the pair of driving pinions 416 is rotated in opposite directions. In response to the rotation of the pair of driven pinions 416, each full thread screw 417 moves toward each fixing object 431, which causes the push ball 418 to press an inner surface of the arc-shaped fixing object 431.

Since each push ball 418 presses the fixing object 431 to the outside, when the fixing part 400 is inserted into the fixing groove H where the first fixing groove 330 and the second fixing groove 230 communicate with each other, the fixing object 431 is not pressed toward the central side of the fixing body 410 in a state where the fixing object 431 is inserted into the first auxiliary groove 331 and the second auxiliary groove 231, thereby preventing the fixing part 410 from being separated from the fixing groove H.

Therefore, it is possible to prevent the LED billboard 200 inserted into the slide-type advertisement frame 300 from being separated from the slide-type advertisement frame 300.

Each second bevel gear 414 is axially fixed to a bar-shaped first fixture B1, having one end fixed to the inside of the fixing body 410, thereby enable to idle.

Each of the driven pinions 416 is divided into a gear portion 416-1 and a shaft portion 416-2. A bearing is formed at an outer peripheral surface of the shaft portion 416-2. In the bearing, one point is fixed by the second fixture B2 fixed inside the fixing body 410 so that the driving pinions 416 can idle.

That is, when a user rotates the ring-shaped ring 411 in one direction, the push ball 418 presses the fixing object 431 to maintain the state in which the fixing object 431 does not enter the opening 420. On the other hand, when the ring-shaped ring 411 is rotated in the opposite direction, the fixing object 431 is in a state to be easily inserted into the opening 420 by pressurization.

In other words, it is true that the LED billboard 200 is fixed in the slide-type advertisement frame 300 by the fixing part 410, but the fixation is not completely firm.

However, it means that the LED billboard 200 in the slide-type advertisement frame 300 may be completely and firmly fixed by the fixing part 400 or easily separated depending on a direction of rotation of the ring-shaped link 411.

As shown in FIG. 9, a rainwater shield plate 500 formed of transparent acrylic is coupled in a sliding manner to a shield long groove 340 provided at the upper and lower entrances of the frame 310, thereby providing a waterproof function.

The shield long groove 340 is formed ahead of the fixing groove H with respect to the front side of the frame 310.

Even if it rains or snows, the rainwater shield plate 500 prevents a damage caused by the rain or snow to the LED billboard 200.

A plurality of rainwater discharge holes 341 are formed along a lower surface of a lower long groove 340 in the shield long groove 340.

In doing so, when rainwater enters between the shield long groove 340 and the rainwater shield plate 500, the rainwater does not pool therein but is discharged through the rainwater discharge holes 341 to the outside of the frame 310.

As shown in FIG. 10, a plurality of coupling holes 110 is arranged in a rectangular shape at the front side of the vehicle 100. The coupling hole 110 is formed such that an upper hole 111 has a diameter wider than that of a lower hole 112 and the upper hole 111 and the lower hole 112 communicate with each other.

A plurality of coupling shafts S3 is provided in the rear surface of the frame 310 at positions corresponding to the plurality of coupling holes 110. The plurality of coupling shafts S3 has a fixing shaft S1 vertically protruding from the rear surface of the frame 310. A separation preventing shaft S2 having a relatively wider diameter than that of a connecting shaft S1 is formed at an end of the fixing shaft S1.

As the plurality of coupling shafts S3 are inserted into the plurality of coupling holes 110, the slide-type advertisement frame 300 may be fixed to the front side of the vehicle 100.

In this case, when an operator inserts the separation preventing shaft S2 into the upper hole 111, the connecting shaft S1 is transferred to the lower hole 112 by a load of the frame 310.

Then, since the separation preventing shaft S2 has a relatively larger diameter than that of the lower hole 112, when the plurality of coupling shafts S3 enter the plurality of coupling holes 110, the plurality of coupling shafts S3 are not separate therefrom, and thus, the slide-type advertisement frame 300 may be firmly fixed to the front side of the vehicle 100.

A first magnet M1 is disposed at one point of the front side of the vehicle 100, and a second magnet M2 is disposed at one point corresponding to the first magnet M1 in the rear side of the frame 310. The first magnet M1 and the second magnet M2 are attached to each other, thereby doubling a fixing force.

As shown in FIG. 11, a bracket 120 is provided at the front side of the vehicle 100, and a plurality of bracket fixing parts 121 each having a groove is formed in the bracket.

A plurality of bending fixation parts 350 to be inserted into the grooves of the bracket fixing parts 121 is provided in the back side of the frame 310 121, so that the slide-type advertisement frame 300 can be fixed to the vehicle 100 due to fixation of the bracket 120.

The gist of the present disclosure is not to undermine the safety and design of the vehicle.

Accordingly, it should be understood that the aforementioned exemplary embodiment is described for illustration in all aspects and is not limited, and the scope of the present disclosure shall be represented by the claims to be described below, instead of the detailed description. In addition, it should be construed that all of the changes or modified forms induced from the meaning and the scope of the claims, and an equivalent concept thereto are included in the scope of the present disclosure.

What is claimed is:
1. A digital billboard for vehicle, comprising
an LED billboard provided at front or back sides of a vehicle,
wherein the vehicle is provided with a slide-type advertisement frame installed at front or back sides,
wherein the slide-type advertisement frame is provided with a frame, an inner groove is provided on one side of the frame, and a first fixing groove is provided at each of upper and lower entrances of the inner groove, and a first auxiliary groove is provided in a direction outward of the first fixing groove with respect to a center of the frame, wherein the LED billboard comprises a display part and a bezel part, and a second fixing groove and a second auxiliary groove are provided in the bezel part to have directions and shapes opposite to directions and shapes of the first fixing groove and the first auxiliary groove of the frame when the LED billboard is inserted into the inner groove of the slide-type advertisement frame, wherein a fixing part is provided with a fixing body having a space inside, an opening is provided at upper and lower surfaces of the fixing body, and a pair of plate springs each having one end fixed to the inside of the fixing body are vertically provided inside the fixing body, and wherein when the fixing part is inserted into the fixing groove, fixtures of the plate springs are inserted into the first auxiliary groove and the second auxiliary groove, respectively, so as to prevent the LED billboard from being separated from the slide-type advertisement frame.

2. The digital billboard of claim 1, wherein each of the front or back sides of the vehicle are perforated at one point, and a connection link is coupled thereto to fix the LED billboard, wherein the connection link is provided with a separation preventing part that is fixed by a torsion spring at a free end.

* * * * *